Feb. 14, 1933.    R. R. McKNIGHT ET AL    1,897,320
METHOD OF FORMING TUBE CONNECTIONS
Filed Feb. 1, 1930    2 Sheets-Sheet 1

Witness
William P. Kilroy

Inventors.
Rufus R. McKnight and
Arthur Webber.
By Samuel W. Banning
Atty.

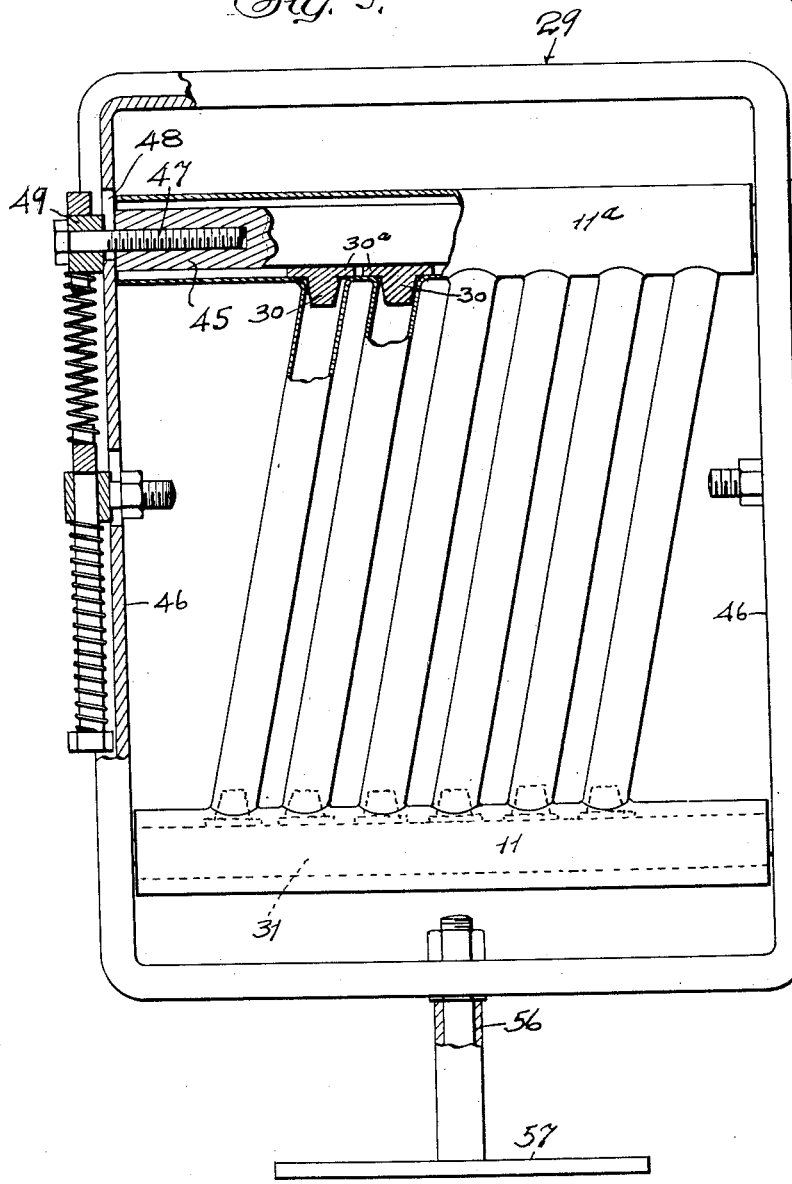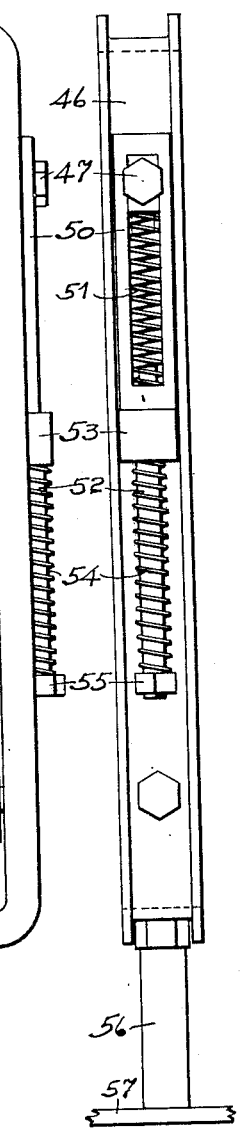

Patented Feb. 14, 1933

1,897,320

UNITED STATES PATENT OFFICE

RUFUS R. McKNIGHT AND ARTHUR WEBBER, OF CHICAGO, ILLINOIS, ASSIGNORS TO THE DE MOE ENGINEERING LABORATORIES, INC., OF CHICAGO, ILLINOIS, A CORPORATION OF ILLINOIS

METHOD OF FORMING TUBE CONNECTIONS

Application filed February 1, 1930. Serial No. 425,104.

This invention relates to new and useful improvements in method of forming tube connections.

This invention has particular reference to a method employed in flaring or throating the apertures in the wall of a tube or drum as preliminary to the welding thereto of a tube or tubes in building up the structure of a boiler or the like, although the process in question is useful in all circumstances in which it is desired to secure tubes to a plate whether curved or flat.

According to the general present practice, apertures are drilled or punched in the shell of a tube or drum, and the tubes to be associated therewith are then entered through the apertures and secured in place by welding material applied around the line of juncture. In some cases, where it is desired to secure tubes to a tubular shell or drum, the latter is left open along one side until the tubes have been secured, after which the edges are bent around into abutting relation and welded along a seam in order to give the cylindrical structure formation to the drum or other structure with which the tubes are associated. These methods are objectionable for several reasons:

First, because the insertion of the attached tubes through the apertures results in a rough or uneven interior surface occasioned by the inward exposure of the end of the tube;

Second, because the welding operation frequently tends to partially burn through the metal wall at the joint; and Third, because such methods are wasteful of time, inconvenient, and otherwise ill-suited to the purpose in view. In the method of the present invention, these objections are overcome by first drilling the apertures in the drum, tube or cylinder to which the tubes are to be attached, and afterwards flaring or throating the apertures in a special manner presently to be described. This forms a circular flange around each aperture, and against each of the circular flanges a tube is abutted and afterwards welded either by direct fusion of the abutting surfaces or by the additional application of welding material around the joint.

When the tubes are secured in this manner, each of the apertures leading into the associated tubes presents a smooth, rounded or throated interior surface without corners or projections which tend to cause lodgment of scale or sediment. At the same time, the joint can be perfectly welded without burning or weakening the metal and the work can be performed more rapidly and with greater precision than in the case of methods generally in vogue at the present time.

Further objects and details of the present process will appear from the detailed description thereof, in conjunction with the accompanying drawings, wherein,—

Fig. 5 is a side elevation of the frame for supporting the tubes and headers during the welding operation; and Fig. 6 is an edge elevation thereof.

Figure 1:
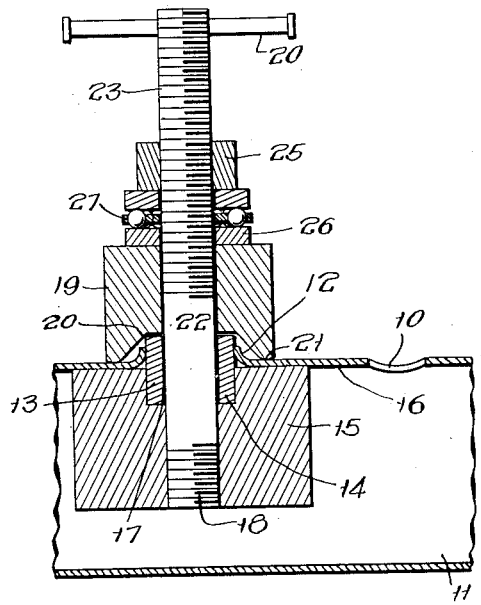
Figure 1 is a sectional elevation of a cylindrical drum or header tube showing the tool employed in the performance of the work where outward throating of a drilled aperture is desired.

In carrying out the present invention, the first step in the operation is that of forming a plain edged aperture 10 in a cylindrical wall, which may be that of a header 11 or other suitable structure. In order to distort the metal outwardly to provide a lip or flange 12, the tool shown in Figure 1 is employed. This tool consists of a male die member 13, which is in the form of a cylindrical block having a diameter greater than the plain hole 10 which is first drilled or otherwise cut in the metal.

The male die member 13 fits within a socket 14 in an inner block 15, the upper or contacting face 16 of which is rounded to conform to the curvature of the header wall against which the block is intended to bear. The die member 13 is provided with a central bore 17 through which a draw screw 18 freely extends, and the end of the screw is threaded into the inner block 15. This male die member 13 co-operates with an exterior female die member 19, which is recessed on its inner face 20 and is provided around the recessed portion with a marginal lip 21 which is curved to conform to the exterior curvature of the drum or header upon which the work is being performed.

The draw screw 18 is preferably plain surfaced along its intermediary portion 22, and again threaded at its upper end 23, through which a handle 24 is entered to facilitate turning of the draw screw. A nut 25 is threaded onto the upper end of the screw, and a washer 26 bears against the outer face of the female die member 19, a ball bearing assembly 27 being interposed between the nut and the washer to reduce friction.

In the use of the tool above described, the draw screw is unthreaded from the inner block 15, which is then entered into the drum or header in position to bring the male die below the hole which is to be flared or throated. Thereafter, the female die member is applied in position above the hole, and the draw screw is then projected inwardly through the male die member and threaded into the block 15. With the parts thus assembled, the nut 25 is turned down by a wrench or the like, and this results in a bodily lifting of the block 15, which carries the male die up into engagement with the rim of the hole or aperture 10, and thereafter continued turning of the nut causes the male die to force its way through the hole or aperture 10, thereby flaring or throating the hole as indicated at 12 in Figure 1. After the throating of the hole has been completed, the draw screw is unthreaded from the block 15 and the male die may be driven inwardly by blows from a hammer or other tool, which disengages the parts and permits the block with the male die to be moved to the next sucessive position.

Figure 2:
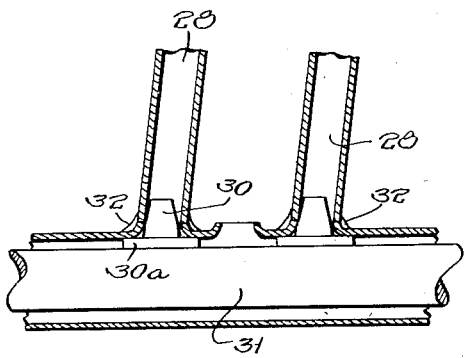
Fig. 2 is a sectional elevation showing the manner in which the tubes are positioned and welded upon the throated aperture.

After the holes in the drum or header have been throated in the manner described, the associated tubes 28 are positioned in abutting relation upon the throated holes, as indicated in Figure 2, and may be held in position by means of a frame 29 within which the tubes are inserted. In common practice, the tubes 28 will stand in oblique relation to the header, which necessitates that the lower or abutting ends of the tubes be slightly beveled, but not to an extent which brings them materially out of register with the circular throated holes to which they are fitted.

In order to maintain the parts in proper register during the welding operation, each of the tubes is temporarily held in position by a conical mandrel 30 provided with a flange 30ª which abuts against the inner surface of the header wall. All of the mandrels are held in positon by introducing a block 65 or rod 31 which maintains the mandrels in projected relation within the group of tubes. Thereafter, the welding operation is performed around the joint, either by directly fusing the metal thereof or by the supplemental addition of welding metal 32. This completes the operation and results in the formation of a smooth, even, and perfect joint, the inner surface of the metal at the point of juncture being rounded off by the throating operation so that no angles or protuberances are present to afford lodgment for scale or sediment.

When the frame 29 is employed, the frame is constructed as follows: The block or rod 31 is employed for supporting a lower header 11, and a similar rod 45 is provided for supporting an upper header 11ª. These rods extend in parallel relation, and are secured within upright side rails 46 of the frame 29, which is of open rectangular shape.

The lower rod 31 is fixed secured within the frame by the provision of screw bolts at each end, but the upper rod 45 is slidably secured by the provision of bolts 47 which pass through vertically elongated slots 48 in the frame and are carried by blocks 49 slidably mounted within a slotted slide bar 50, which is afforded limited vertical travel within the channeled side rails of the frame. Springs 51 bear upwardly against the slide blocks 49 and serve to normally hold the same in elevated position.

Each slide bar is provided with a downwardly extending stem 52 which is slidably entered through a lug 53 extending outwardly from the side rail of the frame, and coil springs 54 on the respective stems bearing against nuts 55 serve to exert a downward tension on the slide bars.

As a matter of convenience, the frame as a whole is swivelly mounted upon a post 56 carried by a base plate 57. This arrangement affords a yieldable carrier for the upper and lower headers, which is necessary in order to compensate for variation in the lengths of the tubes due to expansion during the welding operation. That is to say, as the tubes are welded, expansion will be permitted by the upward yielding of the slotted slide bars, and after the tubes are united by welding to the upper and lower headers, subsequent contraction will be permitted by the sliding of the blocks which carry the upper rod 45, so that bending, straining or other distortion of the structure, by reason of expansion and contraction, will be prevented.

The upper and lower rods which carry the headers can be easily removed from the frame, and the headers and tubes assembled in position, and thereafter the rods can be inserted into the frame and the welding operation performed in the manner described.

The use of the frame affords a convenient and satisfactory method of holding the parts in position and in properly spaced relation during the welding operation.

Figure 3:
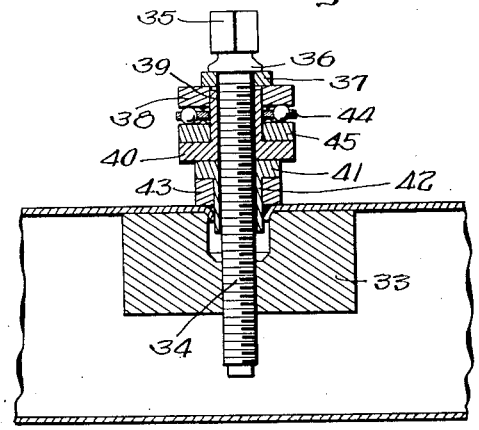
Fig. 3 is a sectional view showing the tool employed in interiorly throating an aperture.
Figure 4:
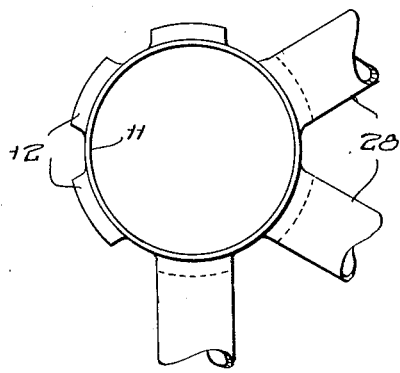
Fig. 4 is an end view of a header showing radially arranged tubes.

Although in cases where exteriorly positioned tubes are to be united with a header the complete operation above described is necessary, nevertheless, the present method of throating an aperture is applicable in cases where it is desired to have the throat extend inwardly as in Fig. 3. In this case, however, the arrangement of the tool is slightly different from that heretofore described, so that additional description is necessary.

In this case, the inner block 33 is employed, which is similar to that heretofore described, and through this block is threaded a draw screw 34, which at its upper end is provided with a squared head 35, which permits aplication of a wrench, and below the head is a flange or collar 36 which is adapted to bear upon a washer 37, which in turn bears upon an inner washer 38 which surrounds a collar 39 upwardly extending from a disk 40 which bears upon the head 41 of an exteriorly positioned male die member 42 which is entered through a bearing 43, the lower face of which is curved to conform to the curvature of the outer face of the drum or header. A ball bearing assembly 44 is interposed between the washer 39 and an inner washer 45 which surrounds the sleeve 39 and bears against the disk 40.

The tool above described is employed in the following manner:

All of the parts which are carried exteriorly of the drum or header are freely mounted upon the draw screw, the inner end of which is threaded through the block 33. After the block 33 has been entered in position below the hole or aperture to be throated, the parts are assembled to bring the lower end of the male die 42 into register with the rim of the hole, after which the screw is rotated, thereby lifting the inner block 33 into abutting relation with the inner surface of the tube wall and forcing down all of the exteriorly positioned disks and washers, including the male die 42, which is thus subjected to a powerful thrust, which causes it to be forced through the aperture, thereby flaring or throating the same until the head 41 of the male die is brought into abutting relation with the exterior block 43, at which time it will be noted the inner end of the male die has been driven through the hole, thereby providing an interior flange or throat. Of course, where the flange or throat extends inwardly, the operation of uniting tubes to the throated aperture, as previously described and as shown in Fig. 2, is omitted.

The present method when employed in its entirety, as first described, permits the various operations to be easily, rapidly and perfectly formed, and results in a tube and header assembly which is strong and durable, and in which the tubes stand in perfectly positioned relation, and in perfect union with the header.

We claim:

1. The method herein described, which consists in forming a plurality of aligned apertures in the wall of a cylindrical header, distending the margins of the apertures to furnish in each instance an outwardly projecting flared throat, bringing the ends of a plurality of substantially parallel tubes into abutting relation respectively with said throats, and maintaining such abutting relation under support applied individually from within through each of the respective throats, and maintained as to all of said throats by a common support furnished from within the interior of the header, and uniting the joints between the respective tubes and throats while thus positioned.

2. The method herein described, which consists in forming a plurality of aligned apertures in the wall of a cylindrical header, distending the margins of the apertures to furnish in each instance an outwardly projecting flared throat, bringing the ends of a plurality of substantially parallel tubes into abutting relation respectively with said throats, and maintaining such abutting relation under support applied individually from within through each of the respective throats, and maintained as to all of said throats by a common support furnished from within the interior of the header, and welding the joints between the respective tubes and throats while thus positioned.

3. The method herein described, which consists in forming a plurality of aligned apertures in the wall of a cylindrical header, distending the margins of the apertures to furnish in each instance an outwardly projecting flared throat, bringing the ends of a plurality of substantially parallel tubes into abutting relation respectively with said throats, and maintaining such abutting relation under support applied individually from within through each of the respective throats, and maintained as to all of said throats by a common support furnished from within the interior of the header, similarly supporting and spacing the opposite ends of the tubes to maintain the same in predetermined spaced relation to one another, and uniting the joints between the respective tubes and throats while thus positioned.

4. The method herein described, which consists in forming a plurality of aligned apertures in the wall of a cylindrical header, distending the margins of the apertures to furnish in each instance an outwardly projecting flared throat, bringing the ends of a plurality of substantially parallel tubes into abutting relation respectively with said throats, and maintaining such abutting relation under support applied individually from within through each of the respective throats, and maintained as to all of said throats by a common support furnished from within the interior, similarly supporting and spacing the opposite ends of the tubes to maintain the same in predetermined spaced relation to one another, and welding the joints between the respective tubes and throats while thus positioned.

5. The method herein described, which consists in forming a plurality of aligned apertures in the walls of a pair of cylindrical headers, spacing said headers from one another to a predetermined distance and with the throated apertures in opposed relation to one another, interposing a plurality of tubes between the headers with the opposite ends of each tube in abutting contact with the corresponding throats in the spaced headers, maintaining such contact at each end of each tube by individually applying positioning support through the respective throated apertures from within the respective headers, and maintaining such positioning support as to all of said throats in each header by a common support furnished from within the interior of each header, and welding the joints between the respective tubes and throats while thus positioned.

6. The method herein described, which consists in forming a plurality of aligned apertures in the walls of a pair of cylindrical headers, spacing said headers from one another to a predetermined distance and with the throated apertures in opposed relation to one another, interposing a plurality of tubes between the headers with the opposite ends of each tube in abutting contact with the corresponding throats in the spaced headers, maintaining such contact at each end of each tube by individually applying positioning support through the respective throated apertures from within the respective headers, and resiliently maintaining such positioning support as to all of said throats in each header by a common support furnished from within the interior of each header to allow for expansion and contraction under heat, and welding the joints between the respective tubes and throats while thus positioned.

7. The method herein described, which consists in forming an aperture in the metal wall of a tubular header, distending the margins of the aperture to furnish a flared throat extending outwardly from the wall of the tubular header, bringing the end of a tube into abutting relation with said throat and at an angle to the axis of the header and maintaining such abutting relation under support applied through the interior of the throat and into the end of the tube and maintained from a point within the header, and welding the joint while thus positioned.

8. The method herein described, which consists in forming an aperture in the metal wall of a tubular header, distending the margins of the aperture to furnish a flared throat extending outwardly from the wall of the tubular header, bringing the end of a tube into abutting relation with said throat and at an angle to the axis of the header and maintaining such abutting relation under support applied through the interior of the throat and into the end of the tube and maintained from a point within the header, and uniting the joint while thus positioned.

In witness that we claim the foregoing we have hereunto subscribed our names this 24th day of January, 1930.

RUFUS R. McKNIGHT.
ARTHUR WEBBER.